(12) United States Patent
Nguyen et al.

(10) Patent No.: US 12,183,060 B2
(45) Date of Patent: Dec. 31, 2024

(54) METHOD AND APPARATUS FOR EXTREME-LIGHT IMAGE ENHANCEMENT

(71) Applicant: VINAI ARTIFICIAL INTELLIGENCE APPLICATION AND RESEARCH JOINT STOCK COMPANY, Ha Noi (VN)

(72) Inventors: Thi Hue Nguyen, Ha Noi (VN); Thi Ngoc Diep Tran, Ha Noi (VN); Cong Thanh Tran, Ha Noi (VN); Duc Minh Khoi Nguyen, Ha Noi (VN); Ho Man Rang Nguyen, Ha Noi (VN); Hai Hung Bui, Ha Noi (VN)

(73) Assignee: VINAI ARTIFICIAL INTELLIGENCE APPLICATION AND RESEARCH JOINT STOCK COMPANY, Ha Noi (VN)

( * ) Notice: Subject to any disclaimer, the term of this patent is extended or adjusted under 35 U.S.C. 154(b) by 379 days.

(21) Appl. No.: 17/894,974

(22) Filed: Aug. 24, 2022

(65) Prior Publication Data

US 2023/0146016 A1 May 11, 2023

(30) Foreign Application Priority Data

Nov. 5, 2021 (VN) .............................. 1-2021-07086

(51) Int. Cl.
| | | |
|---|---|---|
| *G06K 9/00* | (2022.01) | |
| *A61K 35/12* | (2015.01) | |
| *G06V 10/25* | (2022.01) | |
| *G06V 10/50* | (2022.01) | |
| *G06V 10/60* | (2022.01) | |

(Continued)

(52) U.S. Cl.
CPC ............ *G06V 10/764* (2022.01); *G06V 10/50* (2022.01); *G06V 10/60* (2022.01); *G06V 10/82* (2022.01)

(58) Field of Classification Search
CPC ........ G06K 9/00; H04N 23/741; A61K 35/12; G06V 10/25
USPC ....... 382/100, 103, 106, 148, 156, 162, 168, 382/173, 181, 199, 214, 224, 232, 254, 382/266, 274, 276, 286–291, 305, 312; 348/263, 266; 250/221; 280/735
See application file for complete search history.

(56) References Cited

U.S. PATENT DOCUMENTS

| | | | | |
|---|---|---|---|---|
| 2005/0017488 A1* | 1/2005 | Breed | ...................... | E05F 15/43 280/735 |
| 2006/0208169 A1* | 9/2006 | Breed | .................... | B60N 2/268 250/221 |

(Continued)

*Primary Examiner* — Seyed H Azarian
(74) *Attorney, Agent, or Firm* — United One Law Group LLC; Kongsik Kim; Jhongwoo Peck

(57) ABSTRACT

In a method and apparatus for extreme-light image enhancement, an input image is passed to a lighting classification module in order to be classified into two categories: an under-exposed lighting condition and an over-exposed light condition. Then the classified image is subsequently passed to an enhancement module which comprises a first image enhancement unit and a second image enhancement unit using a mapping function based on a gamma mapping function for mapping the classified image to an output image, respectively. A parameter of the gamma mapping function is estimated by a parameter estimation network, based on the classified image. The parameter estimation network may be a lightweight CNN network which is trained by an unsupervised approach.

13 Claims, 6 Drawing Sheets

(51) Int. Cl.
  *G06V 10/764* (2022.01)
  *G06V 10/82* (2022.01)
  *H04N 23/15* (2023.01)

(56) References Cited

U.S. PATENT DOCUMENTS

| | | | |
|---|---|---|---|
| 2019/0197712 A1* | 6/2019 | Talbert | G01J 3/2803 |
| 2021/0149441 A1* | 5/2021 | Bartscherer | G06F 1/1616 |
| 2021/0186334 A1* | 6/2021 | Talbert | H04N 23/741 |
| 2024/0265559 A1* | 8/2024 | Talbert | G01J 3/0208 |

* cited by examiner

METHOD AND APPARATUS FOR EXTREME-LIGHT IMAGE ENHANCEMENT

CROSS-REFERENCE TO RELATED APPLICATION

The present application claims priority from Vietnamese Application No. 1-2021-07086, filed on Nov. 5, 2021, which is incorporated herein by reference in its entirety.

TECHNICAL FIELD

The present invention generally relates to a method and an apparatus for extreme-light image enhancement, and more particularly, to a method and an apparatus highly efficient for extreme-light images which may be captured in under-exposed, over-exposed, or mixed lighting conditions wherein there are too much or too little light both globally and locally. Therefore, the present invention is capable to significantly enhance a dynamic range of a camera installed in any apparatus, system, or edge device, including but not limited to, a smartphone, a tablet, a laptop, a webcam, a mobile device, a personal electronic device, a computing device, a sever, an autonomous vehicle, built-in camera system, and so on.

RELATED ART

The extremes of lighting, such as too much or too little light, usually cause many troubles for machine and human vision. Many recent technical solutions have mainly focused on under-exposure cases where images are often captured in low-light conditions, such as nighttime. These technical solutions have achieved remarkable results for enhancing the quality of images even captured under extreme low-light conditions. However, they are inferior to handle images corresponding to over-exposure or mixed conditions.

The under-exposure, over-exposure, and mixed conditions may constitute a complicated space of images which may require a big and complicated model to provide an enhancement of images under the extremes of lighting.

Therefore, there is a need for a method and an apparatus to enhance quality of images which captured in various extreme lighting conditions, using a lightweight model which suitable for used on edge devices, such as an autonomous vehicle or a smartphone.

SUMMARY

Embodiments of this application provide a method and an apparatus for extreme-light image enhancement. By dividing the original complicated space of images into multiple small and separate subspaces for reducing the need of a big and complicated model. The present invention may significantly enhance quality of images which captured in various extreme lighting conditions by using a lightweight model.

An object of the present invention is to provide a method and an apparatus for extreme-light image enhancement, which is capable to significantly enhance a dynamic range of a camera installed on edge devices, such as a smartphone, a tablet, a laptop, a webcam, a mobile device, a personal electronic device, a computing device, a sever, an autonomous vehicle, built-in camera system.

Various objects to be achieved by the present invention are not limited to the aforementioned objects, and those skilled in the art to which the disclosure pertains may clearly understand other objects from the following descriptions.

A first aspect of the present invention provides a method for extreme-light image enhancement, comprising:
classifying, by a lighting classification module, an input image into a classified image, which corresponding to one of at least a first lighting condition and a second light condition;
receiving, by an image enhancement module, the classified image, wherein the image enhancement module comprises at least a first image enhancement unit and a second image enhancement unit,
wherein each of the first image enhancement unit and the second image enhancement unit, using a mapping function which based on a gamma mapping function and a parameter estimation network which estimates a parameter of the corresponding mapping function, to map the classified image to an output image;
updating, by the corresponding parameter estimation network, an estimated parameter for the mapping function of an image enhancement unit among the first image enhancement unit and the second image enhancement unit;
wherein the image enhancement module is configured to perform:
mapping, by the first image enhancement unit of the image enhancement module, the classified image to the output image, if the classified image is corresponding to the first lighting condition,
mapping, by the second image enhancement unit of the image enhancement module, the classified image to the output image, if the classified image is corresponding to the second lighting condition.

Preferably, the first lighting condition is an under-exposed lighting condition, and the second lighting condition is an over-exposed lighting condition.

According to an embodiment, the image enhancement module further comprises a third image enhancement unit, and the input image is further classified into a classified image which corresponding to a third light condition;
wherein the third image enhancement unit using a mapping function which based on a gamma mapping function and a parameter estimation network which estimates a parameter of the corresponding mapping function, to map the classified image to an output image;
wherein the corresponding parameter estimation network updates an estimated parameter for the mapping function of the third image enhancement unit; and
the third image enhancement unit maps the classified image to the output image if the classified image is corresponding to the third lighting condition.

Preferably, the first lighting condition is an under-exposed lighting condition, the second lighting condition is an over-exposed lighting condition, and the third lighting is a mixed lighting condition.

Preferably, the mapping function is defined by the following equation:

$$Y = 1 - (1-I)^\gamma$$

wherein Y denotes the output image, I denotes the input image, and $\gamma$ denotes the parameter of the gamma mapping function.

Preferably, said classifying step comprising:
extracting a histogram information from the input image, and
determining whether the input image is corresponding to the under-exposed lighting condition, the mixed lighting condition, or the over-exposed light condition, based on peaks of the histogram information.

According to an embodiment, the peaks of the histogram information are detected by fitting a Gaussian Mixture Model to the histogram information.

According to an embodiment, the parameter estimation network using a Unet network architecture,
wherein each basic block in said Unet network architecture is an inverted residual and linear bottleneck block, and is designed on a basic of a MobileNet network.

The parameter estimation network is trained by using a loss function defined by the following equation:

$$L = w_{col}L_{col} + w_{exp}L_{exp} + w_{con}L_{con} + w_{tv}L_{tv}$$

wherein:
$w_{col}$, $w_{exp}$, $w_{con}$, $w_{tv}$ are coefficients to balance between a color balance, an exposure correction, a contrast preservation, and a smoothness of the mapping function, respectively,
$L_{col}$ is a color constancy loss function, $L_{exp}$ is an exposure loss function, $L_{con}$ is a contrast preserving loss function, and $L_{tv}$ is a total variation loss function.

The exposure loss function is defined by the following equation:

$$L_{exp} = \frac{1}{M}\sum_{i=1}^{M}\|Y_i - E\|_2^2.$$

The color constancy loss function is defined by the following equation:

$$L_{col} = \Sigma_{\forall (p,q) \in C}(J^p - J^q)^2 \text{ for } C \in \{(R,B),(B,G),(G,R)\}.$$

The contrast preserving loss function is defined by the following equation:

$$L_{con} = \frac{1}{WH}\sum_i\sum_j C_x(I_{i,j})(C_x(I_{i,j}) - C_x(Y_{i,j}))^2 + C_y(I_{i,j})(C_y(I_{i,j}) - C_y(Y_{i,j}))^2.$$

The total variation loss function is defined by the following equation:

$$L_{tv} = \frac{1}{N}\sum_{c \in R,G,B}(\nabla_x \gamma_c + \nabla_y \gamma_c).$$

Wherein:

$$C_x(I_{i,j}) = \frac{|I_{i,j} - I_{i+1,j}|}{1 - \min(I_{i,j}, I_{i+1,j})},$$

$$C_y(I_{i,j}) = \frac{|I_{i,j} - I_{i,j+1}|}{1 - \min(I_{i,j}, I_{i,j+1})},$$

and
R, G, B denote the red, green, and blue channels of the input image.

Another aspect of the present invention provides an apparatus for extreme-light image enhancement, comprising:
one or more processors;
a computer-readable medium having instructions stored there on, which, when executed by the one or more processors, cause the apparatus to execute one or more components, wherein the one or more components comprise:
a lighting classification module for classifying an input image into a classified image, which corresponding to one of at least a first lighting condition and a second light condition;
an image enhancement module for receiving the classified image, wherein the image enhancement module comprises at least a first image enhancement unit and a second image enhancement unit,
wherein each of the first image enhancement unit and the second image enhancement unit, using a mapping function which based on a gamma mapping function and a parameter estimation network which estimates a parameter of the corresponding mapping function, to map the classified image to an output image;
wherein a corresponding parameter estimation network updates an estimated parameter for a mapping function of an image enhancement unit among the first image enhancement unit and the second image enhancement unit;
wherein the image enhancement module is configured so that:
the first image enhancement unit of the image enhancement module maps the classified image to the output image, if the classified image is corresponding to the first lighting condition,
the second image enhancement unit of the image enhancement module maps the classified image to the output image, if the classified image is corresponding to the second condition.

Preferably, the first lighting condition is an under-exposed lighting condition, and the second lighting condition is an over-exposed lighting condition.

According to an embodiment, the image enhancement module further comprises a third image enhancement unit, and the input image is further classified into a classified image which corresponding to a third light condition;
wherein the third image enhancement unit using a mapping function which based on a gamma mapping function and a parameter estimation network which estimates a parameter of the corresponding mapping function, to map the classified image to an output image;
wherein the corresponding parameter estimation network updates an estimated parameter for the mapping function of the third image enhancement unit; and
the third image enhancement unit maps the classified image to the output image if the classified image is corresponding to the third lighting condition.

Preferably, the first lighting condition is an under-exposed lighting condition, the second lighting condition is an over-exposed lighting condition, and the third lighting is a mixed lighting condition.

Preferably, the mapping function is defined by the following equation:

$$Y = 1 - (1-I)^\gamma$$

wherein Y denotes the output image, I denotes the input image, and $\gamma$ denotes the parameter of the gamma mapping function.

Preferably, the lighting classification module is configured to perform:
extracting a histogram information from the input image, and determining whether the input image is corresponding to the under-exposed lighting condition, the mixed lighting condition, or the over-exposed light condition, based on peaks of the histogram information.

According to an embodiment, the peaks of the histogram information are detected by fitting a Gaussian Mixture Model to the histogram information.

According to an embodiment, the parameter estimation network using a Unet network architecture,
wherein each basic block in said Unet network architecture is an inverted residual and linear bottleneck block, and is designed on a basic of a MobileNet network.

The parameter estimation network is trained by using a loss function defined by the following equation:

$$L = w_{col}L_{col} + w_{exp}L_{exp} + w_{con}L_{on} + w_{tv}L_{tv}$$

wherein:

$w_{exp}$, $w_{con}$, $w_{tv}$ are coefficients to balance between a color balance, an exposure correction, a contrast preservation, and a smoothness of the mapping function, respectively, $L_{col}$ is a color constancy loss function, $L_{exp}$ is an exposure loss function, $L_{con}$ is a contrast preserving loss function, and $L_{tv}$ is a total variation loss function.

The exposure loss function is defined by the following equation:

$$L_{exp} = \frac{1}{M} \sum_{i=1}^{M} \|Y_i - E\|_2^2.$$

The color constancy loss function is defined by the following equation:

$$L_{col} = \Sigma_{\forall (p,q) \in C} (J^p - J^q)^2 \text{ for } C \in \{(R,B),(B,G),(G,R)\}.$$

The contrast preserving loss function is defined by the following equation:

$$L_{con} = \frac{1}{WH} \sum_i \sum_j C_x(I_{i,j})(C_x(I_{i,j}) - C_x(Y_{i,j}))^2 + C_y(I_{i,j})(C_y(I_{i,j}) - C_y(Y_{i,j}))^2.$$

the total variation loss function is defined by the following equation:

$$L_{tv} = \frac{1}{N} \sum_{c \in R,G,B} (\nabla_x \gamma_c + \nabla_y \gamma_c).$$

Wherein:

$$C_x(I_{i,j}) = \frac{|I_{i,j} - I_{i+1,j}|}{1 - \min(I_{i,j}, I_{i+1,j})},$$

$$C_y(I_{i,j}) = \frac{|I_{i,j} - I_{i,j+1}|}{1 - \min(I_{i,j}, I_{i,j+1})},$$

and

R, G, B denote the red, green, and blue channels of the input image.

Still Another aspect of the present invention provides a non-transitory computer readable storage medium storing a computer readable program, wherein the computer readable program is configured to implement the above-mentioned method.

DETAILED DESCRIPTION

The technical solutions in the embodiments of the present application are clearly described in the following with reference to the accompanying drawings. Apparently, the embodiments to be described are merely a part rather than all of the embodiments of the present application. All other embodiments obtained by persons of ordinary skill in the art based on the embodiments of the present invention without creative efforts shall fall within the protection scope of the present invention.

In general, under-exposure image is referred as the one taken in low-light environment or under-exposed lighting condition, while over-exposure image is referred as the one captured with too much light or over-exposed lighting condition. Both groups of under-exposure image and over-exposure image refer to globally distorted images. In contrast, mixing image is referred as both under-exposure and over-exposure locally or mixed lighting condition.

Herein, an image is captured corresponding to under-exposed lighting condition, over-exposed lighting condition, or mixed lighting condition, may be commonly referred as an extreme-light image. However, the present invention is not limited thereto, any other lighting condition which is different from a standard lighting condition of an image capturing device, may be referred as an extreme-light image, and the number of lighting conditions may be varied due to different applications.

Although, various embodiments of the present invention are intended to provide an enhancement for extreme-light images, wherein the extreme-light images may be corresponding to lighting conditions which are referred as under-exposed lighting condition, over-exposed lighting condition, or mixed lighting condition. However, the present invention is not limited thereto.

Moreover, said lighting conditions may include two groups (a first lighting condition and a second lighting condition), such as, an under-exposed lighting condition and an over-exposed lighting condition; an under-exposed lighting condition and a mixed lighting condition; or a mixed lighting condition and an over-exposed lighting condition, for example. Said lighting conditions may include three groups (a first lighting condition, a second lighting condition, and a third lighting condition), such as, an under-exposed lighting condition, an over-exposed lighting condition, and a mixed lighting condition, for example.

It should be understood that terms "first", "second", and "third", and so on, are intended to distinguish among same or similar components only, without any limitations to their order, their number, or the same. The mentioned components may be interchangeable, and as for descriptive purposes, some embodiments may use terms "first" and "third" without using of term "second", for example.

Figure 1A:
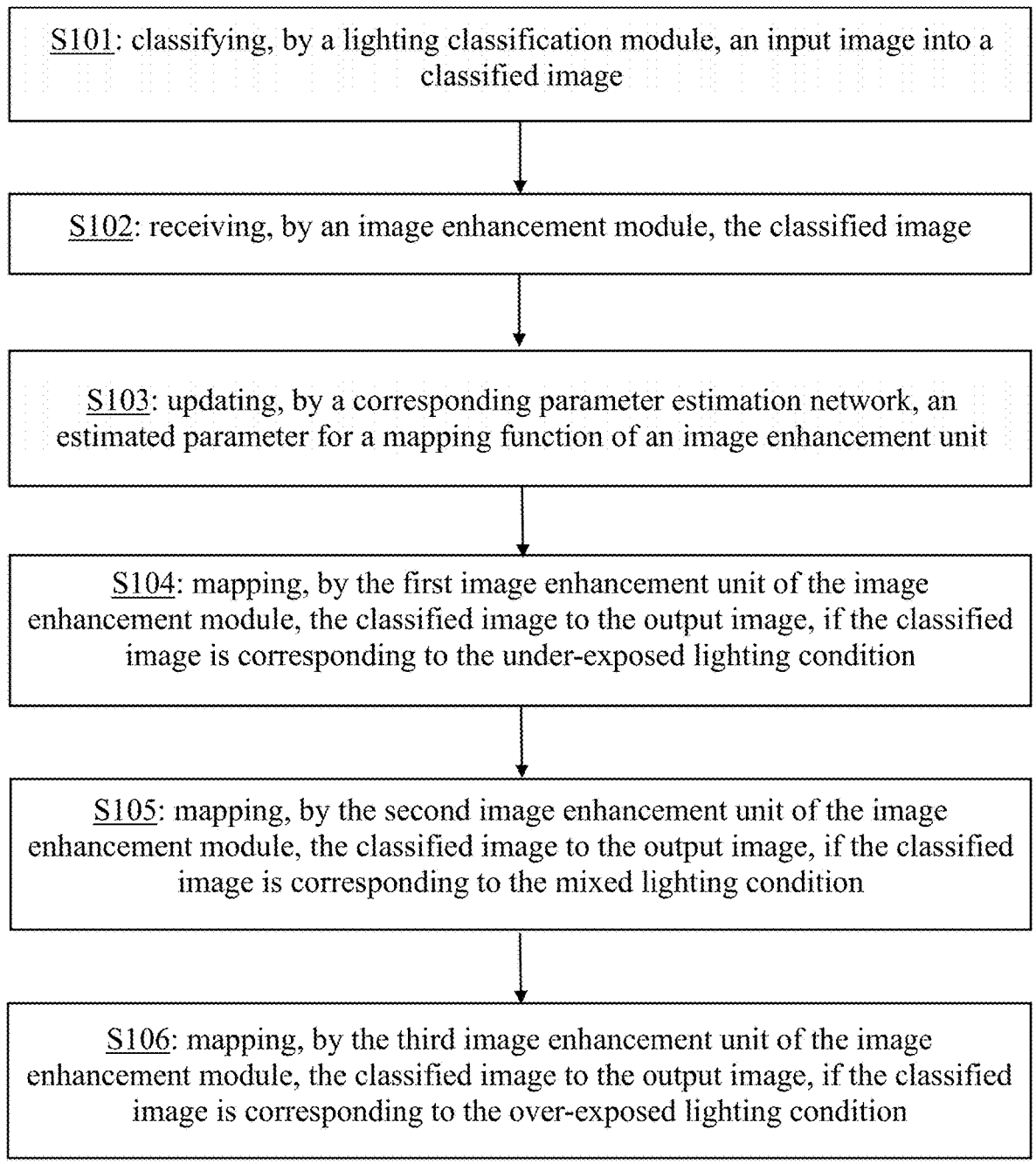
FIG. 1A is a flowchart of a method for extreme-light image enhancement according to an embodiment of the present invention.

As shown in FIG. 1A, the method for extreme-light image enhancement according to an embodiment of the present invention includes the following steps from step S101 to step S106.

In this embodiment, lighting conditions may include a first lighting condition, a second lighting condition, and a third lighting condition. The first lighting condition, the second lighting condition, and the third lighting condition may be referred to an under-exposed lighting condition, an over-exposed lighting condition, and a mixed lighting condition, respectively. However, the present invention is not limited thereto.

S101: classifying, by a lighting classification module, an input image into a classified image. The input image is classified so as to corresponding to at least one of under-exposed lighting condition, mixed lighting condition, and over-exposed light condition. However, the inventive concepts are not limited thereto, the type and number of the lighting conditions may be varied due to the practical application.

S102: receiving, by an image enhancement module, the classified image. The image enhancement module comprises at least a first image enhancement unit, a second image enhancement unit, and a third image enhancement unit. Each of the first image enhancement unit, the second image enhancement unit, and the third image enhancement unit, using a mapping function which based on a gamma mapping function and a parameter estimation network which estimates a parameter of the corresponding mapping function, to map the classified image to an output image.

S103: updating, by a corresponding parameter estimation network, an estimated parameter for a mapping function of an image enhancement unit.

According to embodiments of the present invention, each of the first image enhancement unit, the second image enhancement unit, and the third image enhancement unit includes a mapping function and a parameter estimation network. As for a convenience, the first image enhancement unit may include a first mapping function and a first parameter estimation network, the second image enhancement unit may include a second mapping function and a second parameter estimation network, and the third image enhancement unit may include a third mapping function and a third parameter estimation network.

In the step of S103, the first parameter estimation network will update the estimated parameter for the first mapping function of the first image enhancement unit, the second parameter estimation network will update the estimated parameter for the second mapping function of the second image enhancement unit, and the third parameter estimation network will update the estimated parameter for the third mapping function of the third image enhancement unit.

S104: mapping, by the first image enhancement unit of the image enhancement module, the classified image to the output image, if the classified image is corresponding to the under-exposed lighting condition.

In this step, the first image enhancement unit of the image enhancement module uses the estimated parameter updated by the first parameter estimation network as a parameter for the first mapping function.

S105: mapping, by the second image enhancement unit of the image enhancement module, the classified image to the output image, if the classified image is corresponding to the over-exposed lighting condition.

In this step, the second image enhancement unit of the image enhancement module uses the estimated parameter updated by the second parameter estimation network as a parameter for the second mapping function.

S106: mapping, by the third image enhancement unit of the image enhancement module, the classified image to the output image, if the classified image is corresponding to the mixed lighting condition.

In this step, the third image enhancement unit of the image enhancement module uses the estimated parameter updated by the third parameter estimation network as a parameter for the third mapping function.

In some preferred embodiments, the mapping function is defined by the following equation:

$$Y=1-(1-I)^\gamma \quad (1)$$

wherein Y denotes the output image, I denotes the input image, and $\gamma$ denotes the parameter of the gamma mapping function.

The gamma mapping function is nonlinear operation that is often used to encode and decode luminance in the image processing technology, and well known for using to enhance the image contrast. The gamma mapping function is defined by the following equation:

$$Y=I^\gamma \quad (2)$$

Instead of using the typical equation (2), the present invention uses the equation (1) by applying on the negative image. In results, this may have the following benefits. At first, unlike the original gamma function, the inverted function provides a broader range for increasing the intensity value. Specifically, in the mapping function, $\gamma$ in the range [1; 00] is used to increase the intensity value, while the value in range [0; 1] is used to decrease the intensity value. It is worth remembering that objectives of the present invention are to increase image brightness when the input is under-exposed and decrease the brightness when the input is over-exposed. This may give a wider $\gamma$ range for dark areas helps to learn for enhancing under-exposure image more gradually. In addition, the inverted function is observed that for learning the mapping function on the inverted image, it makes a training process is more stable than applying on the original one.

In some preferred embodiments, the classifying step may comprise extracting a histogram information from the input image, and determining whether the input image is corresponding to the under-exposed lighting condition, the mixed lighting condition, or the over-exposed light condition, based on peaks of the histogram information.

The histogram information is a brightness feature of an image. Specifically, if an image's brightness histogram is skewed to the left or all of the peaks are in the dark region, said image may be classified as an under-exposed lighting condition image. Conversely, if all of the peaks are in the bright region, said image may be classified as an over-exposed lighting condition image. The remaining case, where the peaks are distributed in both the dark and bright regions, said image may be classified as a mixed lighting condition image.

The peaks of the histogram information are detected by fitting a Gaussian Mixture Model (GMM) to the histogram information. In particular, the GMM with three components may be fitted with the histogram information. However, the inventive concepts are not limited thereto, the number of the components of GMM may be varied or less than three.

After fitting a GMM, the components of the GMM which have likelihood at the mean value lower than 5% of the maximum likelihood are filtered out. Then mean values of the remaining components are used to classify. If all of the means are lower than 0.4, said image is classified as an under-exposed lighting condition image. If all means are greater than 0.6, said image is classified as an over-exposed lighting condition image. Otherwise, said image is classified as a mixed lighting condition image.

Figure 2:
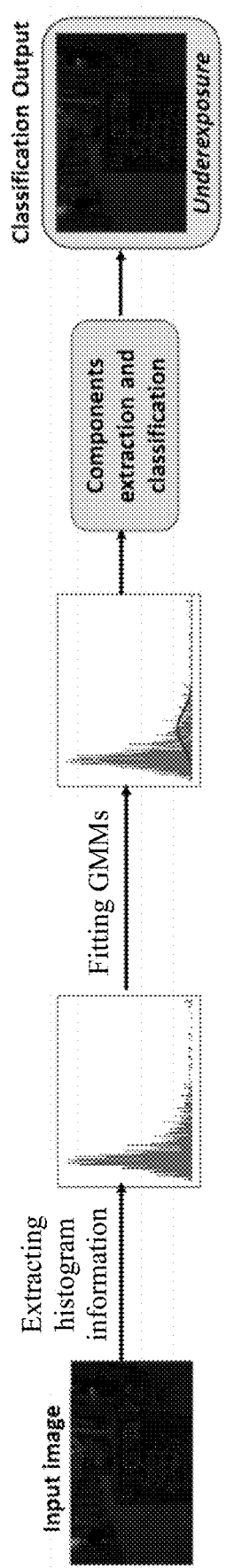
FIG. 2 is a flowchart diagram of a lighting classification module according to an embodiment of the present invention.

An example of above image classification is illustrated in FIG. 2. As illustrated, an input image is processed by extracting histogram information, and fitting GMMs. Subsequently, by components extraction and classification of GMMs, a classification output (classified image) is obtained, such as underexposure as showed in the drawing.

In some preferred embodiments, the parameter estimation network using a Unet network architecture, wherein each basic block in said Unet network architecture is an inverted residual and linear bottleneck block, and is designed on a basic of a MobileNet network.

To produce only positive gamma coefficient estimation, the output's absolute value is taken instead of using ReLU activation to avoid discarding any network information.

In general, Unet and MobileNet are widely known in the art, details of these networks may be found in a paper with title of "U-Net: Convolutional Networks for Biomedical Image Segmentation" by Olaf Ronneberger et. al., and a paper with title of "MobileNetV2: Inverted Residuals and Linear Bottlenecks" by Mark Sandler et. al., for example. Detailed descriptions thereof will be omitted to avoid redundancy.

The parameter estimation network is trained by using a loss function defined by the following equation:

$$L = w_{col}L_{col} + w_{exp}L_{exp} + w_{con}L_{con} + w_{tv}L_{tv}$$

wherein:
$w_{col}$, $w_{exp}$, $w_{con}$, $w_{tv}$ are coefficients to balance between a color balance, an exposure correction, a contrast preservation, and a smoothness of the mapping function, respectively,
$L_{col}$ is a color constancy loss function, $L_{exp}$ is an exposure loss function, $L_{con}$ is a contrast preserving loss function, and $L_{tv}$ is a total variation loss function.

The exposure loss function is used to adjust the brightness of the under or over exposed image. It measures the distance between the average intensity value of a local region to the well-exposed level E, which may be set to 0.6 in certain implementations. The exposure loss function is defined by the following equation:

$$L_{exp} = \frac{1}{M}\sum_{i=1}^{M}\|Y_i - E\|_2^2.$$

Wherein M is the number of non-overlapping patches with predetermined size, such as 32×32, and $Y_1$ is the patch's average intensity value.

The color constancy loss function is used to correct deviations because photos taken in the low-light environment often have color distortion problems. The average color intensity in each R, G, B channel is equal to the mean of the whole image, so the color constancy loss function is used to constrain the relationship between the three channels. The color constancy loss function is defined by the following equation:

$$L_{col} = \sum_{\forall(p,q)\in C}(J^p - J^q)^2 \text{ for } C \in \{(R,B),(B,G),(G,R)\}.$$

wherein $J^p$ is the mean value of channel p of output image Y.

The contrast preserving loss function is needed to keep high contrast regions of an image. In some situations, the well-exposed regions (regions with high contrast value) can appear along with the under or over exposed regions in the same image. Such well-exposed regions are needed to preserve. The contrast preserving loss function is defined by the following equation:

$$L_{con} = \frac{1}{WH}\sum_i\sum_j C_x(I_{i,j})(C_x(I_{i,j}) - C_x(Y_{i,j}))^2 + C_y(I_{i,j})(C_y(I_{i,j}) - C_y(Y_{i,j}))^2.$$

wherein $C_x$ and $C_y$ are two functions calculating the difference between two neighboring pixels in the horizontal and vertical axis, respectively. They are built based on the contrast between every two adjacent pixels, are defined by the following equations:

$$C_x(I_{i,j}) = \frac{|I_{i,j} - I_{i+1,j}|}{1 - \min(I_{i,j}, I_{i+1,j})},$$

$$C_y(I_{i,j}) = \frac{|I_{i,j} - I_{i,j+1}|}{1 - \min(I_{i,j}, I_{i,j+1})}.$$

To avoid zero gradient of the "min" function which can cause trouble for back-propagation during the training phase, the "min" is defined by the following equation: $\min(v_1, v_2) \approx 0.5[(v_1 + v_2) - \sqrt{(v_1 - v_2)^2 + \propto}]$, wherein $\propto$ is a smoothing hyperparameter.

The total variation loss function is applied as a familiar smoothness prior in image restoration tasks because in the texture areas, the mapping function should be smooth to avoid creating visual artifacts. The total variation loss function is defined by the following equation:

$$L_{tv} = \frac{1}{N}\sum_{c \in R,G,B}(\nabla_x \gamma_c + \nabla_y \gamma_c).$$

wherein $\gamma$ denotes the parameter of the gamma mapping function for each channel c, and R, G, B denote the red, green, and blue channels of the input image.

Figure 3A:
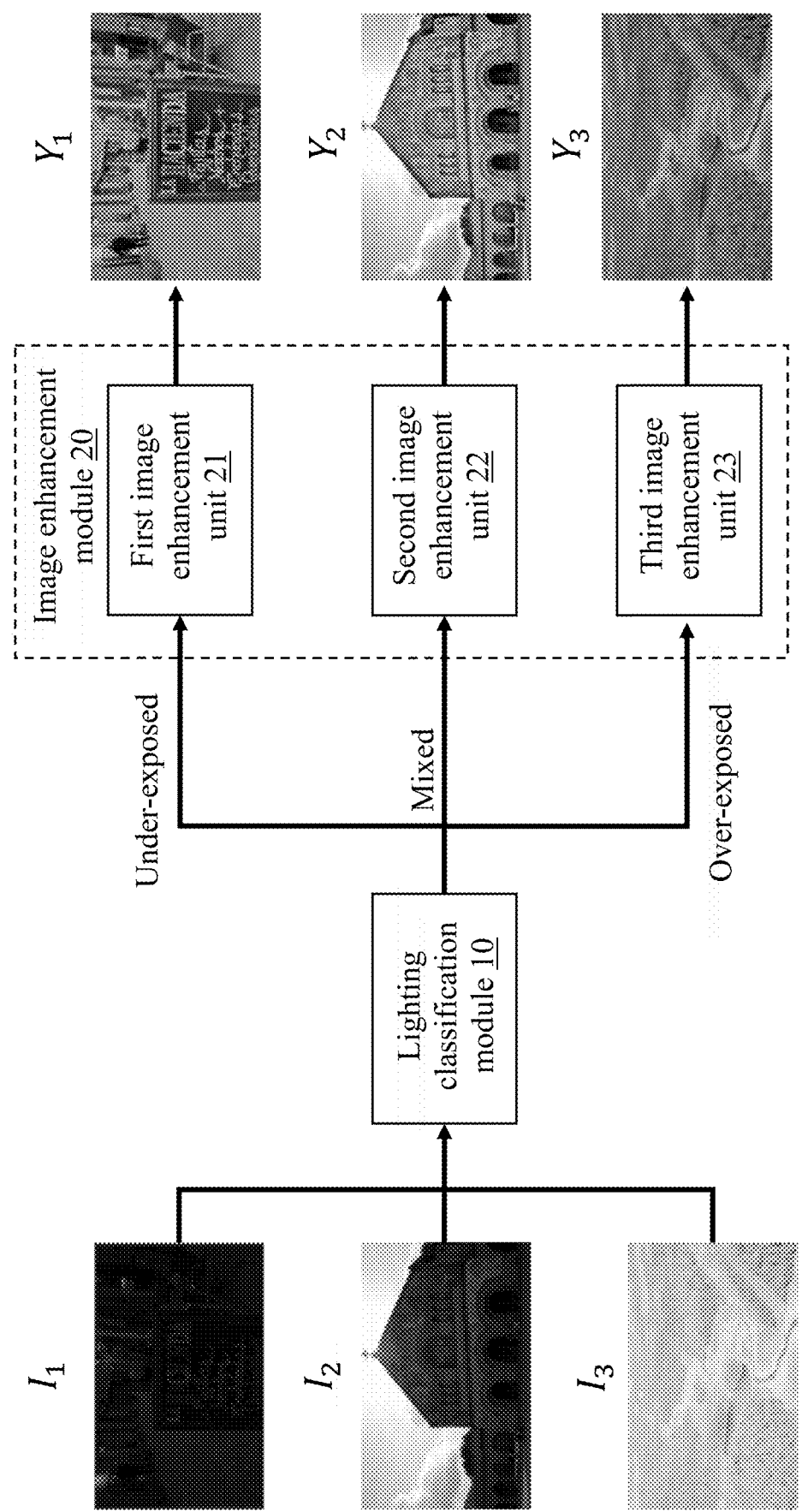
FIG. 3A is a schematic diagram of an apparatus for extreme-light image enhancement according to an embodiment of the present invention.

As shown in FIG. 3A, an apparatus for extreme-light image enhancement according to an embodiment of the present invention includes essential components of a lighting classification module 10, an image enhancement module 20. Details of configuration of these components will be described hereafter.

In general, the apparatus for extreme-light image enhancement according to the embodiment of the present invention may be implemented in any form, such as a smartphone, a tablet, a laptop, a webcam, a mobile device, a personal electronic device, a computing device, a sever, an autonomous vehicle, built-in camera system, for example.

The lighting classification module 10 is for classifying an input image into a classified image, which corresponding to at least one of under-exposed lighting condition, mixed lighting condition, and over-exposed light condition.

The image enhancement module 20 is for receiving the classified image, wherein the image enhancement module 20 comprises a first image enhancement unit 21, a second image enhancement unit 22, and a third image enhancement unit 23. Each of the first image enhancement unit 21, the second image enhancement unit 22, and the third image enhancement unit 23 uses a mapping function which based on a gamma mapping function and a parameter estimation network which estimates a parameter of the corresponding mapping function to map the classified image to an output image.

According to embodiments of the present invention, each of the first image enhancement unit 21, the second image enhancement unit 22, and the third image enhancement unit 23 includes a mapping function and a parameter estimation network. As for a convenience, the first image enhancement unit 21 may include a first mapping function and a first parameter estimation network, the second image enhancement unit 22 may include a second mapping function and a second parameter estimation network, and the third image enhancement unit 23 may include a third mapping function and a third parameter estimation network.

To this end, the first parameter estimation network will update the estimated parameter for the first mapping function of the first image enhancement unit 21, the second parameter estimation network will update the estimated parameter for the second mapping function of the second image enhancement unit 22, and the third parameter estimation network will update the estimated parameter for the third mapping function of the third image enhancement unit 23.

The first image enhancement unit 21 of the image enhancement module 20 maps the classified image to the output image $Y_1$, if the classified image is from an input image $I_1$ corresponding to the under-exposed lighting condition.

The first image enhancement unit 21 of the image enhancement module 20 uses the estimated parameter updated by the first parameter estimation network as a parameter for the first mapping function.

The second image enhancement unit 22 of the image enhancement module 20 maps the classified image to the output image $Y_2$, if the classified image is from an input image $I_2$ corresponding to the over-exposed lighting condition.

The second image enhancement unit 22 of the image enhancement module 20 uses the estimated parameter updated by the second parameter estimation network as a parameter for the second mapping function.

The third image enhancement unit 23 of the image enhancement module 20 maps the classified image to the output image $Y_3$, if the classified image is from an input image $I_3$ corresponding to the mixed lighting condition.

The third image enhancement unit 23 of the image enhancement module 20 uses the estimated parameter updated by the third parameter estimation network as a parameter for the third mapping function.

In general, the first image enhancement unit, the second image enhancement unit, and the third image enhancement unit using a shared architecture. Thus, the first mapping function, the second mapping function, and the third mapping function are similar to each other. The first parameter estimation network, the second parameter estimation network, and the third parameter estimation network are similar to each other.

Figure 4:
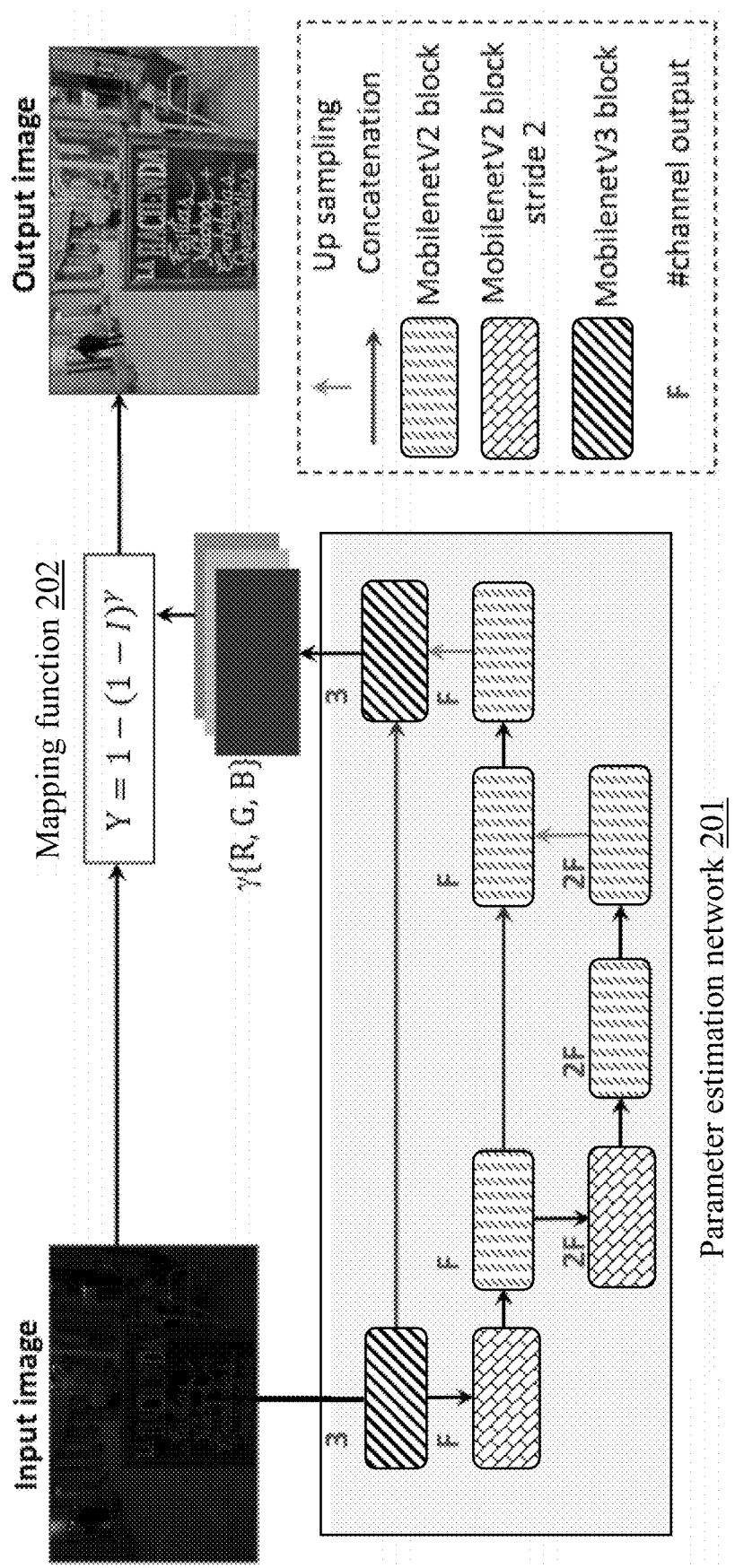
FIG. 4 is a schematic architecture diagram of an image enhancement unit according to an embodiment of the present invention.

In the following descriptions with reference to FIG. 4, the first mapping function, the second mapping function, and the third mapping function are described in more details and commonly referred as a mapping function 202. The first parameter estimation network, the second parameter estimation network, and the third parameter estimation network described in more details and commonly referred as a parameter estimation network 201.

Similar as described above, the mapping function 202 is defined by the following equation: $Y=1-(1-I)^\gamma$.

The lighting classification module 10 is configured to extracting a histogram information from the input image, and determining whether the input image is corresponding to the under-exposed lighting condition, the mixed lighting condition, or the over-exposed light condition, based on peaks of the histogram information. The peaks of the histogram information are detected by fitting a Gaussian Mixture Model to the histogram information.

The parameter estimation network 201 using a Unet network architecture, wherein each basic block in said Unet network architecture is an inverted residual and linear bottleneck block, and is designed on a basic of a MobileNet network. As also illustrated in the drawing, the basic blocks of the parameter estimation network 201 may be MobileNetV2 block, MobileNetV3 block, and MobileNetV2 block stride 2 (stride 2 is referred to the kernel sliding through image by moving 2 pixels per step). The parameter estimation network 201 applies for three channels of R, G, B (denoted as 3 on the drawing), and a coefficient γ is estimated for each channel, that is $\gamma_c$, $c \in \{R, G, B\}$.

Still similar as described above, the parameter estimation network is trained by using a loss function defined by the following equation:

$$L = w_{col}L_{col} + w_{exp}L_{exp} + w_{con}L_{con} + w_{tv}L_{tv}$$

wherein:
$w_{col}$, $w_{exp}$, $w_{con}$, $w_{tv}$ are coefficients to balance between a color balance, an exposure correction, a contrast preservation, and a smoothness of the mapping function, respectively,
$L_{col}$ is a color constancy loss function, $L_{exp}$ is an exposure loss function, $L_{con}$ is a contrast preserving loss function, and $L_{tv}$ is a total variation loss function.

Details and characteristics of the mapping function, the exposure loss function, the color constancy loss function, the contrast preserving loss function, and the total variation loss function are substantially same as described above, repeated descriptions thereof will be omitted to avoid redundancy.

Figure 1B:
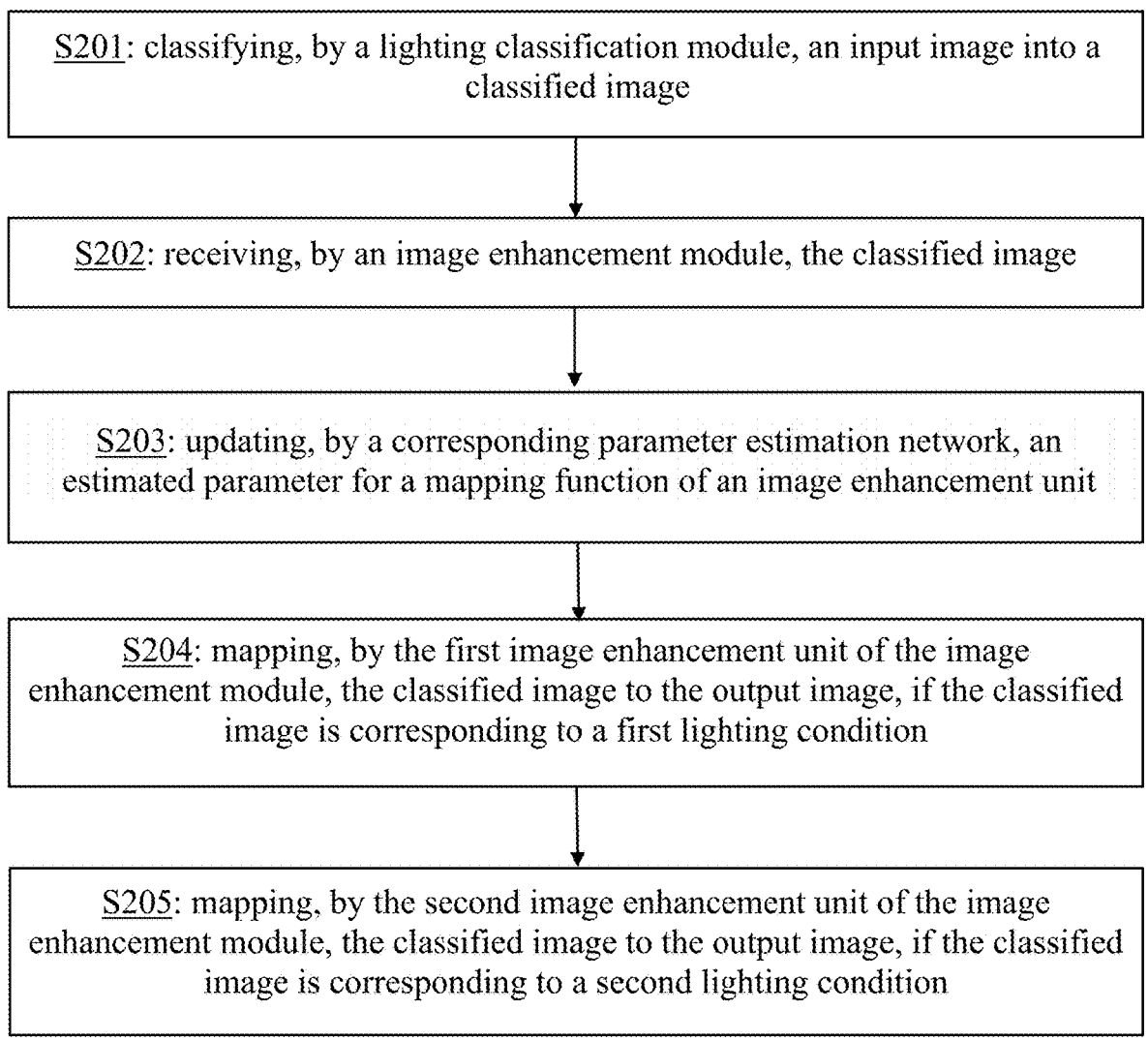
FIG. 1B is a flowchart of a method for extreme-light image enhancement according to an embodiment of the present invention.

As shown in FIG. 1B, the method for extreme-light image enhancement according to an embodiment of the present invention includes the following steps from step S201 to step S205.

In this embodiment, lighting conditions may include a first lighting condition and a second lighting condition. The first lighting condition and the second lighting condition may be referred to an under-exposed lighting condition and an over-exposed lighting condition, respectively. However, the present invention is not limited thereto, the type and number of the lighting conditions may be varied due to the practical application.

As for an alternative embodiment, the first lighting condition and the second lighting condition may be referred to an under-exposed lighting condition and a mixed lighting condition, respectively.

As still for an alternative embodiment, the first lighting condition and the second lighting condition may be referred to a mixed lighting condition and an over-exposed lighting condition, respectively.

S201: classifying, by a lighting classification module, an input image into a classified image. The input image is classified so as to corresponding to at least one of a first lighting condition and a second light condition. The first lighting condition and the second lighting condition may be referred to an under-exposed lighting condition and an over-exposed lighting condition, respectively.

S202: receiving, by an image enhancement module, the classified image. The image enhancement module comprises at least a first image enhancement unit and a second image enhancement unit. Each of the first image enhancement unit and the second image enhancement unit, using a mapping function which based on a gamma mapping function and a parameter estimation network which estimates a parameter of the corresponding mapping function, to map the classified image to an output image.

S203: updating, by a corresponding parameter estimation network, an estimated parameter for a mapping function of an image enhancement unit.

According to embodiments of the present invention, each of the first image enhancement unit and the second image enhancement unit, includes a mapping function and a parameter estimation network. As for a convenience, the first image enhancement unit may include a first mapping function and a first parameter estimation network, and the second image enhancement unit may include a second mapping function and a second parameter estimation network.

In the step of S203, the first parameter estimation network will update the estimated parameter for the first mapping function of the first image enhancement unit, and the second parameter estimation network will update the estimated parameter for the second mapping function of the second image enhancement unit.

S204: mapping, by the first image enhancement unit of the image enhancement module, the classified image to the output image, if the classified image is corresponding to the first lighting condition, i.e., the under-exposed lighting condition.

In this step, the first image enhancement unit of the image enhancement module uses the estimated parameter updated by the first parameter estimation network as a parameter for the first mapping function.

S205: mapping, by the second image enhancement unit of the image enhancement module, the classified image to the output image, if the classified image is corresponding to the second lighting condition, i.e., the over-exposed lighting condition.

In this step, the second image enhancement unit of the image enhancement module uses the estimated parameter updated by the second parameter estimation network as a parameter for the second mapping function.

In general, the method of the embodiment illustrated in FIG. 1B includes components which are same or similar to that of the embodiment illustrated in FIG. 1A. Therefore, repeated descriptions are intended to be omitted to avoid redundancy.

Similarly, as mentioned in the above embodiment, a Gaussian is fitted to the image's histogram. After that, the mean value of this distribution is used to classify the lighting condition of the image. If the mean is lower than 0.5, this image is classified as an under-exposed image. Conversely, it is classified as an over-exposed image.

For reducing computational cost, a step of pre-processing an input image may be implemented to resize the input image to obtain a corresponding thumbnail image. This step may be performed prior to the step of classifying of the above-mentioned embodiments.

Figure 3B:
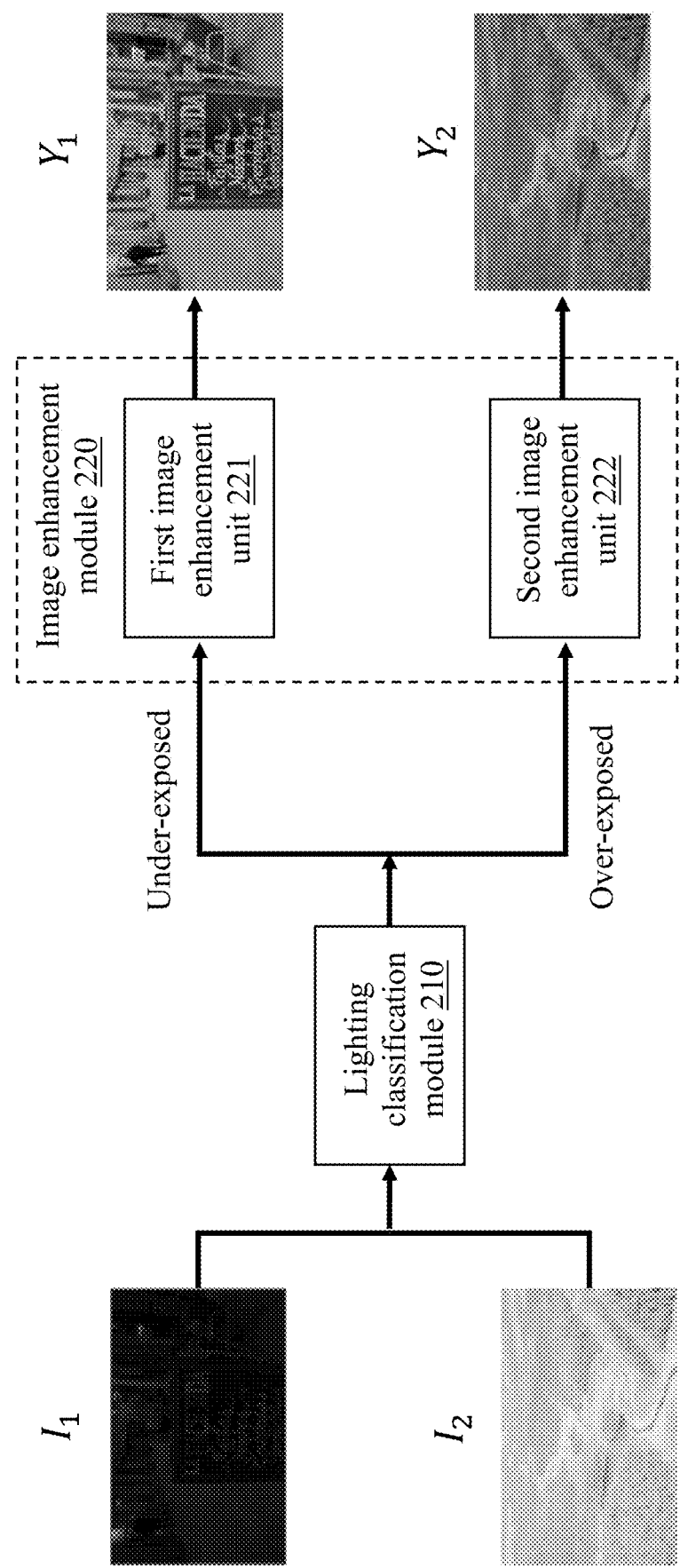
FIG. 3B is a schematic diagram of an apparatus for extreme-light image enhancement according to an embodiment of the present invention.

As shown in FIG. 3B, an apparatus for extreme-light image enhancement according to an embodiment of the present invention includes essential components of a lighting classification module 210, an image enhancement module 220. Details of configuration of these components will be described hereafter.

The lighting classification module 210 is for classifying an input image into a classified image, which corresponding to at least one of under-exposed lighting condition and over-exposed light condition.

The image enhancement module 220 is for receiving the classified image, wherein the image enhancement module 220 comprises a first image enhancement unit 221 and a second image enhancement unit 222. Each of the first image enhancement unit 221 and the second image enhancement unit 222 uses a mapping function which based on a gamma mapping function and a parameter estimation network which estimates a parameter of the corresponding mapping function to map the classified image to an output image.

According to embodiments of the present invention, each of the first image enhancement unit 221 and the second image enhancement unit 222, includes a mapping function and a parameter estimation network. As for a convenience, the first image enhancement unit 221 may include a first mapping function and a first parameter estimation network, and the second image enhancement unit 222 may include a second mapping function and a second parameter estimation network.

To this end, the first parameter estimation network will update the estimated parameter for the first mapping function of the first image enhancement unit 221, and the second parameter estimation network will update the estimated parameter for the second mapping function of the second image enhancement unit 222.

The first image enhancement unit 221 of the image enhancement module 220 maps the classified image to the output image $Y_1$, if the classified image is from an input image $I_1$ corresponding to the under-exposed lighting condition.

The first image enhancement unit 221 of the image enhancement module 220 uses the estimated parameter updated by the first parameter estimation network as a parameter for the first mapping function.

The second image enhancement unit 222 of the image enhancement module 220 maps the classified image to the output image $Y_2$, if the classified image is from an input image $I_2$ corresponding to the over-exposed lighting condition.

The second image enhancement unit 222 of the image enhancement module 220 uses the estimated parameter updated by the second parameter estimation network as a parameter for the second mapping function.

In general, the apparatus of the embodiment illustrated in FIG. 3B includes components which are same or similar to that of the embodiment illustrated in FIG. 3A. Therefore, repeated descriptions are intended to be omitted to avoid redundancy.

The present invention, with its above described features, can provide an extreme-light image enhancement, that is highly enhance the contrast of extreme-light images both globally and locally, and therefore capable to significantly enhance a dynamic range of a camera installed in any apparatus, system, or edge device, including but not limited to, a smartphone, a tablet, a laptop, a webcam, a mobile device, a personal electronic device, a computing device, a sever, an autonomous vehicle, built-in camera system, and so on.

It should be understood that the method and the apparatus for extreme-light image enhancement according to the present invention can be applied for image processing in various application, such as a real-time image processing application in a full self-driving system of autonomous vehicles, a mobile image processing application which may enhance quality of images even at the time of shooting or after that (i.e. images are stored in a storage medium), a sever image processing software, for example.

Also, each part of this application may be implemented by using hardware, software, firmware, or their combination. In the foregoing implementations, multiple steps or methods may be implemented by using the software or firmware that are stored in a memory and executed by an appropriate instruction execution system. For example, if using the hardware to implement, as same as in another implementation, any one of the following technologies known in the field or their combination may be used to implement: a discrete logical circuit of a logical gating circuit used to implement a logic function for a digital signal, an appropriate specified integrated circuit of a combinational logical gating circuit, a programmable gate array (PGA), a field programmable gate array (FPGA), and so on.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. In addition, functional units in the embodiments of the present application may be integrated into one processing module, or each of the units may exist alone physically, or two or more units are integrated into one module. The integrated modules may be implemented in the form of hardware or software functional modules. If implemented in the form of software functional modules and sold or used as an independent product, the integrated modules may also be stored in a computer-readable storage medium. The storage medium may be a magnetic disk, an optical disc, a read-only memory (Read-Only Memory, ROM) or a random access memory (Random Access Memory, RAM), or the like.

What is disclosed above is merely exemplary embodiments of this application, and certainly is not intended to limit the protection scope of this application. Therefore, equivalent variations made in accordance with the claims of this application shall fall within the scope of this application.

What is claimed is:

1. A method for extreme-light image enhancement, comprising:
classifying, by a lighting classification module, an input image into a classified image, which corresponding to one of at least a first lighting condition and a second light condition;
receiving, by an image enhancement module, the classified image, wherein the image enhancement module comprises at least a first image enhancement unit and a second image enhancement unit, wherein each of the first image enhancement unit and the second image enhancement unit, using a mapping function which is based on a gamma mapping function and a parameter estimation network which estimates a parameter of the corresponding mapping function, maps the classified image to an output image; and
updating, by the corresponding parameter estimation network, an estimated parameter for the mapping function of an image enhancement unit among the first image enhancement unit and the second image enhancement unit,
wherein the image enhancement module is configured to perform:
mapping, by the first image enhancement unit of the image enhancement module, the classified image to the output image, if the classified image is corresponding to the first lighting condition; and
mapping, by the second image enhancement unit of the image enhancement module, the classified image to the output image, if the classified image is corresponding to the second lighting condition,
wherein the mapping function is defined by the following equation: Y=1−(1−I)y, wherein Y denotes the output image, I denotes the input image, and y denotes the parameter of the gamma mapping function, and
wherein said classifying comprises:
extracting a histogram information from the input image; and
detecting peaks of the histogram information by fitting a Gaussian Mixture Model to the histogram information.

2. The method according to claim 1, wherein the first lighting condition is an under-exposed lighting condition, and the second lighting condition is an over-exposed lighting condition.

3. The method according to claim 1, wherein said classifying further comprises:
determining whether the input image is corresponding to the under-exposed lighting condition or the over-exposed light condition, based on the peaks of the histogram information.

4. The method according to claim 1, wherein the parameter estimation network uses a U-Net convolutional neural network architecture, and wherein each basic block in said U-Net network architecture is an inverted residual and linear bottleneck block, and is designed on a basic of a MobileNet network.

5. The method according to claim 4, wherein the parameter estimation network is trained by using a loss function defined by the following equation:

$$L = w_{col}L_{col} + w_{exp}L_{exp} + w_{con}L_{con} + w_{tv}L_{tv}$$

wherein:
$w_{col}$, $w_{exp}$, $w_{con}$, $w_{tv}$ are coefficients to balance between a color balance, an exposure correction, a contrast preservation, and a smoothness of the mapping function, respectively, and
$L_{col}$ is a color constancy loss function, $L_{exp}$ is an exposure loss function, $L_{con}$ is a contrast preserving loss function, and $L_{tv}$ is a total variation loss function.

6. The method according to claim 5, wherein the exposure loss function is defined by the following equation:

$$L_{exp} = \frac{1}{M}\sum_{i=1}^{M}\|Y_i - E\|_2^2,$$

wherein the color constancy loss function is defined by the following equation:

$$L_{col} = \Sigma_{\forall(p,q)\in C}(J^p - J^q)^2 \text{ for } C \in \{(R,B),(B,G),(G,R)\},$$

wherein the contrast preserving loss function is defined by the following equation:

$$L_{con} = \frac{1}{WH}\sum_i \sum_j C_x(I_{i,j})(C_x(I_{i,j}) - C_x(Y_{i,j}))^2 + C_y(I_{i,j})(C_y(I_{i,j}) - C_y(Y_{i,j}))^2,$$

wherein the total variation loss function is defined by the following equation:

$$L_{tv} = \frac{1}{N}\sum_{c \in R,G,B}(\nabla_x \gamma_c + \nabla_y \gamma_c),$$

and
wherein:

$$C_x(I_{i,j}) = \frac{|I_{i,j} - I_{i+1,j}|}{1 - \min(I_{i,j}, I_{i+1,j})},$$

$$C_y(I_{i,j}) = \frac{|I_{i,j} - I_{i,j+1}|}{1 - \min(I_{i,j}, I_{i,j+1})},$$

and
R, G, B denote the red, green, and blue channels of the input image.

7. A non-transitory computer readable storage medium storing a computer readable program, wherein the computer readable program is configured to implement the method according to claim 1.

8. An apparatus for extreme-light image enhancement, comprising:
one or more processors;
a non-transitory computer-readable medium having instructions stored there on, which, when executed by the one or more processors, cause the apparatus to execute one or more components, wherein the one or more components comprise:
a lighting classification module for classifying an input image into a classified image, which corresponding to one of at least a first lighting condition and a second light condition; and
an image enhancement module for receiving the classified image, wherein the image enhancement module comprises at least a first image enhancement unit and a second image enhancement unit,
wherein each of the first image enhancement unit and the second image enhancement unit, using a mapping function which is based on a gamma mapping function and a parameter estimation network which estimates a parameter of the corresponding mapping function, maps the classified image to an output image,
wherein a corresponding parameter estimation network updates an estimated parameter for a mapping function of an image enhancement unit among the first image enhancement unit and the second image enhancement unit,
wherein the image enhancement module is configured so that:
the first image enhancement unit of the image enhancement module maps the classified image to the output image, if the classified image is corresponding to the first lighting condition;
and the second image enhancement unit of the image enhancement module maps the classified image to the output image, if the classified image is corresponding to the second condition,
wherein the mapping function is defined by the following equation: Y=1−(1−I)y, wherein Y denotes the output image, I denotes the input image, and y denotes the parameter of the gamma mapping function, and
wherein the lighting classification module is configured to:
extracting a histogram information from the input image; and
detect peaks of the histogram information by fitting a Gaussian Mixture Model to the histogram information.

9. The apparatus according to claim 8, wherein the first lighting condition is an under-exposed lighting condition, and the second lighting condition is an over-exposed lighting condition.

10. The apparatus according to claim 8, wherein the lighting classification module is further configured to:
determine whether the input image is corresponding to the under-exposed lighting condition or the over-exposed light condition, based on the peaks of the histogram information.

11. The apparatus according to claim 8, wherein the parameter estimation network uses a U-Net convolutional neural network architecture, and wherein each basic block in said U-Net network architecture is an inverted residual and linear bottleneck block, and is designed on a basic of a MobileNet network.

12. The apparatus according to claim 11, wherein the parameter estimation network is trained by using a loss function defined by the following equation:

$$L=w_{col}L_{col}+w_{exp}L_{exp}+w_{con}L_{con}+w_{tv}L_{tv}$$

wherein:
$w_{exp}$, $w_{con}$, $w_{tv}$ are coefficients to balance between a color balance, an exposure correction, a contrast preservation, and a smoothness of the mapping function, respectively, and
$L_{col}$ is a color constancy loss function, $L_{exp}$ is an exposure loss function, $L_{con}$ is a contrast preserving loss function, and $L_{tv}$ is a total variation loss function.

13. The apparatus according to claim 12, wherein the exposure loss function is defined by the following equation:

$$L_{exp} = \frac{1}{M}\sum_{i=1}^{M}\|Y_i - E\|_2^2,$$

wherein the color constancy loss function is defined by the following equation:

$$L_{col}=\sum_{\forall(p,q)\in C}(J^p - J^q)^2 \text{ for } C\in\{(R,B),(B,G),(G,R)\},$$

wherein the contrast preserving loss function is defined by the following equation:

$$L_{con} = \frac{1}{WH}\sum_i \sum_j C_x(I_{i,j})(C_x(I_{i,j}) - C_x(Y_{i,j}))^2 + C_y(I_{i,j})(C_y(I_{i,j}) - C_y(Y_{i,j}))^2,$$

wherein the total variation loss function is defined by the following equation:

$$L_{tv} = \frac{1}{N} \sum_{c \in R,G,B} (\nabla_x \gamma_c + \nabla_y \gamma_c),$$

and
wherein:

$$C_x(I_{i,j}) = \frac{|I_{i,j} - I_{i+1,j}|}{1 - \min(I_{i,j}, I_{i+1,j})},$$

$$C_y(I_{i,j}) = \frac{|I_{i,j} - I_{i,j+1}|}{1 - \min(I_{i,j}, I_{i,j+1})},$$

and
R, G, B denote the red, green, and blue channels of the input image.

\* \* \* \* \*